United States Patent

Gu

[11] Patent Number: 5,485,191
[45] Date of Patent: Jan. 16, 1996

[54] IMAGE FORMING APPARATUS HAVING TONE CORRECTING FUNCTION

[75] Inventor: Sono Gu, Ohmiya, Japan

[73] Assignee: Canon Kabushiki Kaisha, Tokyo, Japan

[21] Appl. No.: 945,920

[22] Filed: Sep. 17, 1992

[30] Foreign Application Priority Data

Sep. 18, 1991 [JP] Japan .................. 3-268381

[51] Int. Cl.6 ................................. G01D 15/14
[52] U.S. Cl. .................. 347/131; 347/133; 347/240; 347/251; 358/298
[58] Field of Search ................ 346/108, 160; 358/298, 461, 519; 355/208; 347/129, 131, 133, 224, 240, 251

[56] References Cited

U.S. PATENT DOCUMENTS

| | | | |
|---|---|---|---|
| 4,879,577 | 11/1989 | Mabrouk et al. | 355/208 |
| 5,089,848 | 2/1992 | Kusuda et al. | 355/206 |
| 5,153,609 | 10/1992 | Ando et al. | 346/108 |
| 5,194,878 | 3/1993 | Murakami et al. | 346/108 |
| 5,250,959 | 10/1993 | Yamada et al. | %346/108 |
| 5,258,783 | 11/1993 | Sasanuma et al. | 346/157 |
| 5,298,944 | 3/1994 | Sawayama et al. | 355/208 |
| 5,305,060 | 4/1994 | Fukushima | 355/208 |
| 5,315,352 | 5/1994 | Nakane et al. | 355/208 X |
| 5,343,235 | 8/1994 | Fukui et al. | 346/160 |

Primary Examiner—Peter S. Wong
Assistant Examiner—Randy W. Gibson
Attorney, Agent, or Firm—Fitzpatrick, Cella, Harper & Scinto

[57] ABSTRACT

An image forming apparatus including an electrophotographic photosensitive member; a latent image forming device for forming an electrostatic latent image by charging the photosensitive member and exposing it to light information; a controller for controlling the latent image forming means to control tone reproducibility of the electrostatic latent image; an image forming device for forming an image having light, halftone and dark portions, for tone controls, a detector for detecting a state of the tone control image, and wherein the controller controls the electrostatic latent image forming device on the basis of a datum from the detector and predetermined tone correcting information.

6 Claims, 7 Drawing Sheets

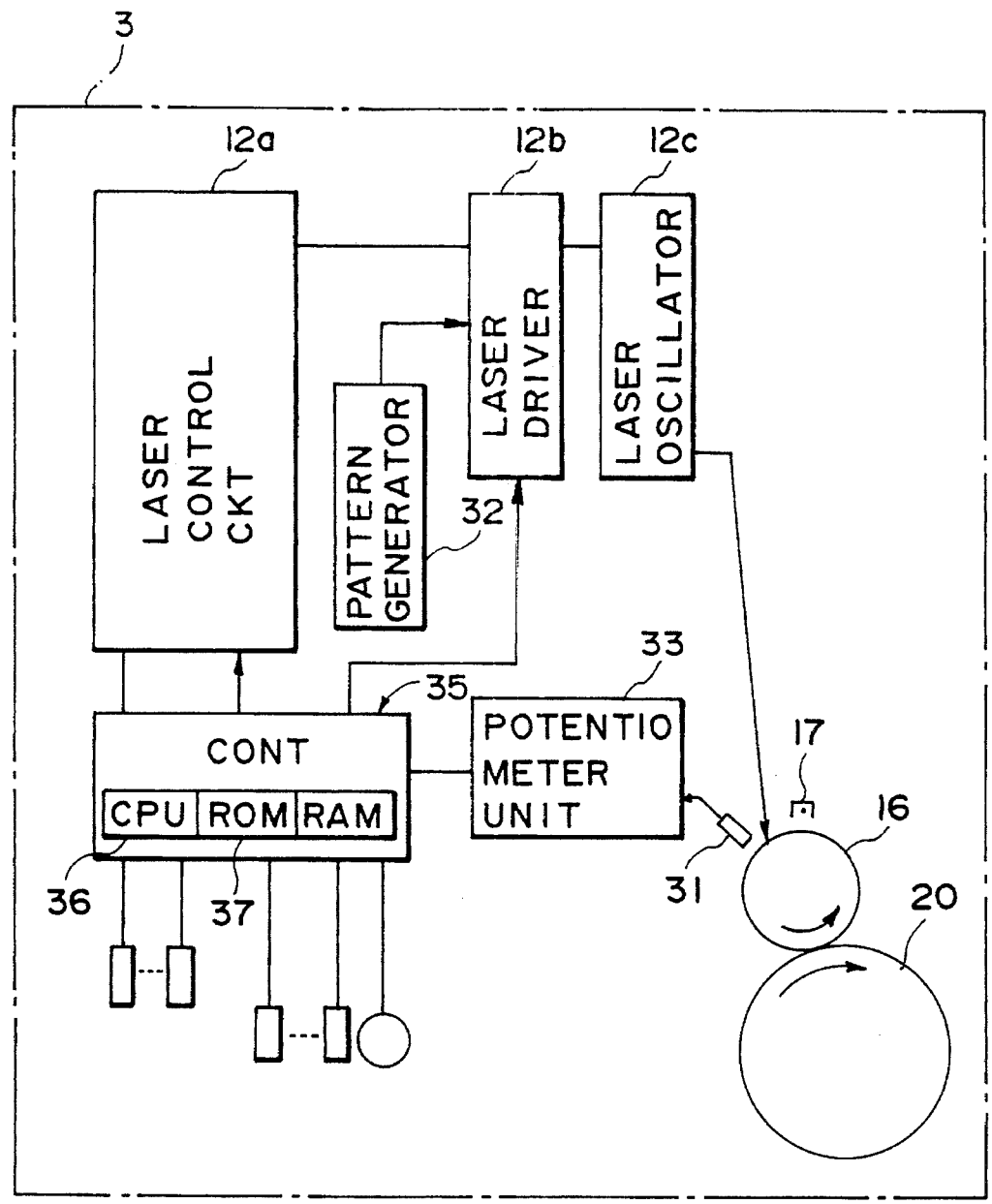
F I G. 1

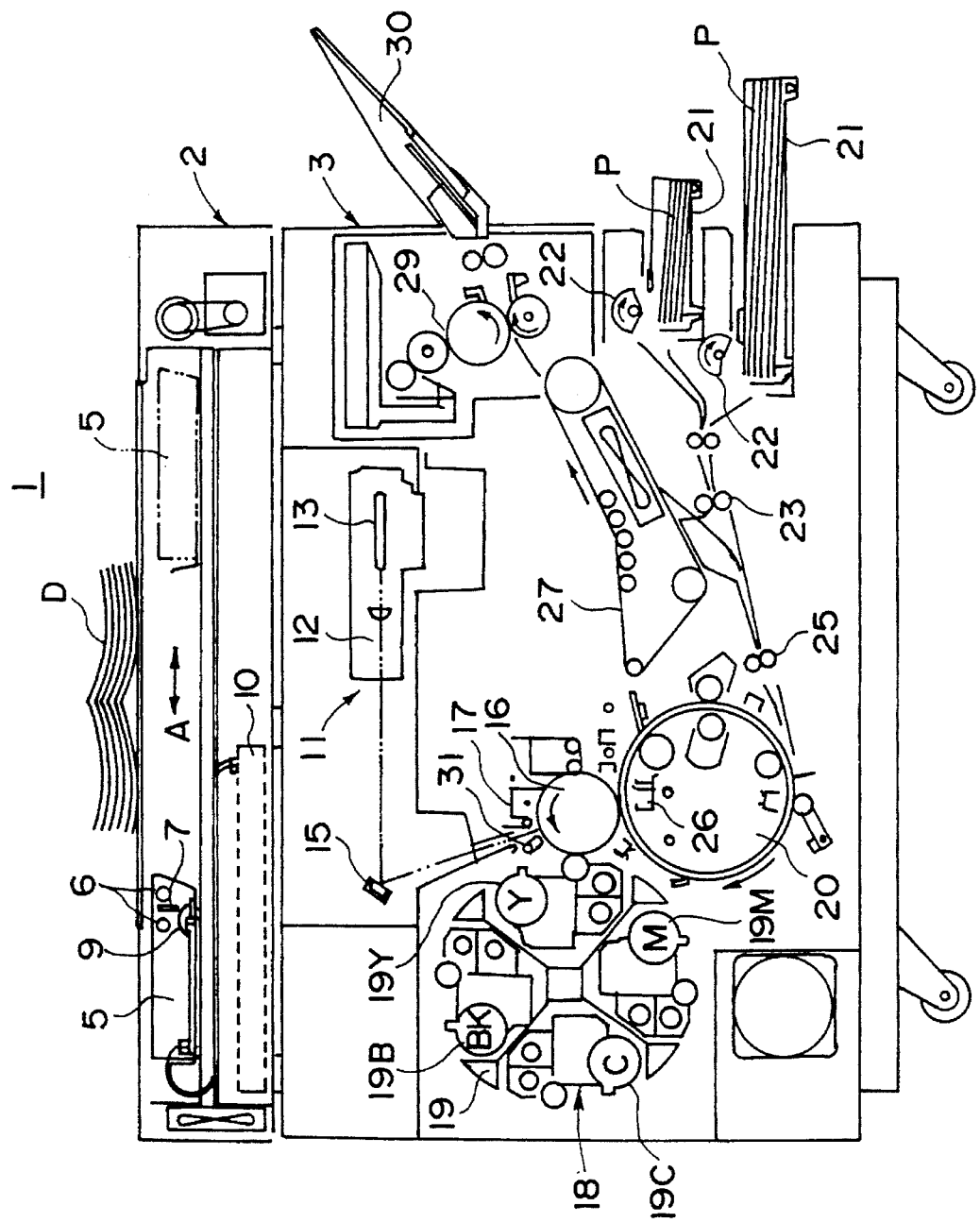
F I G. 2

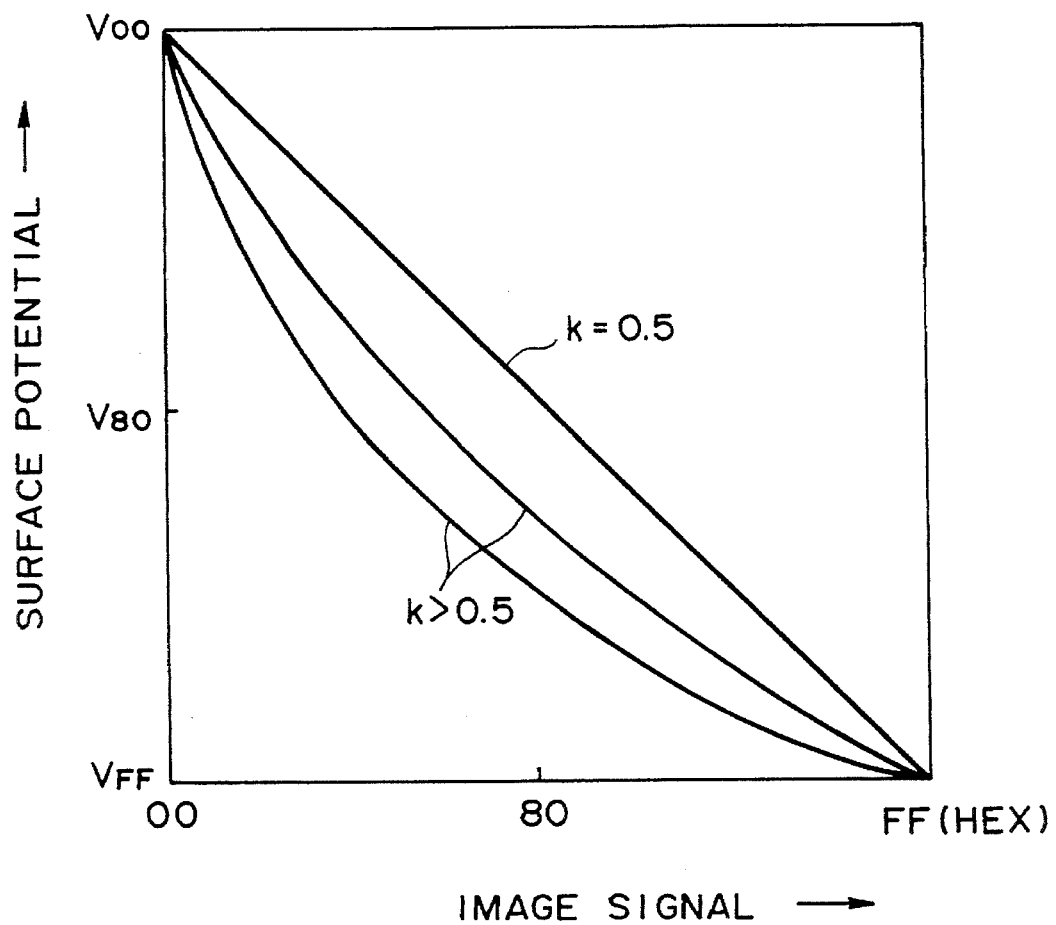
F I G. 3

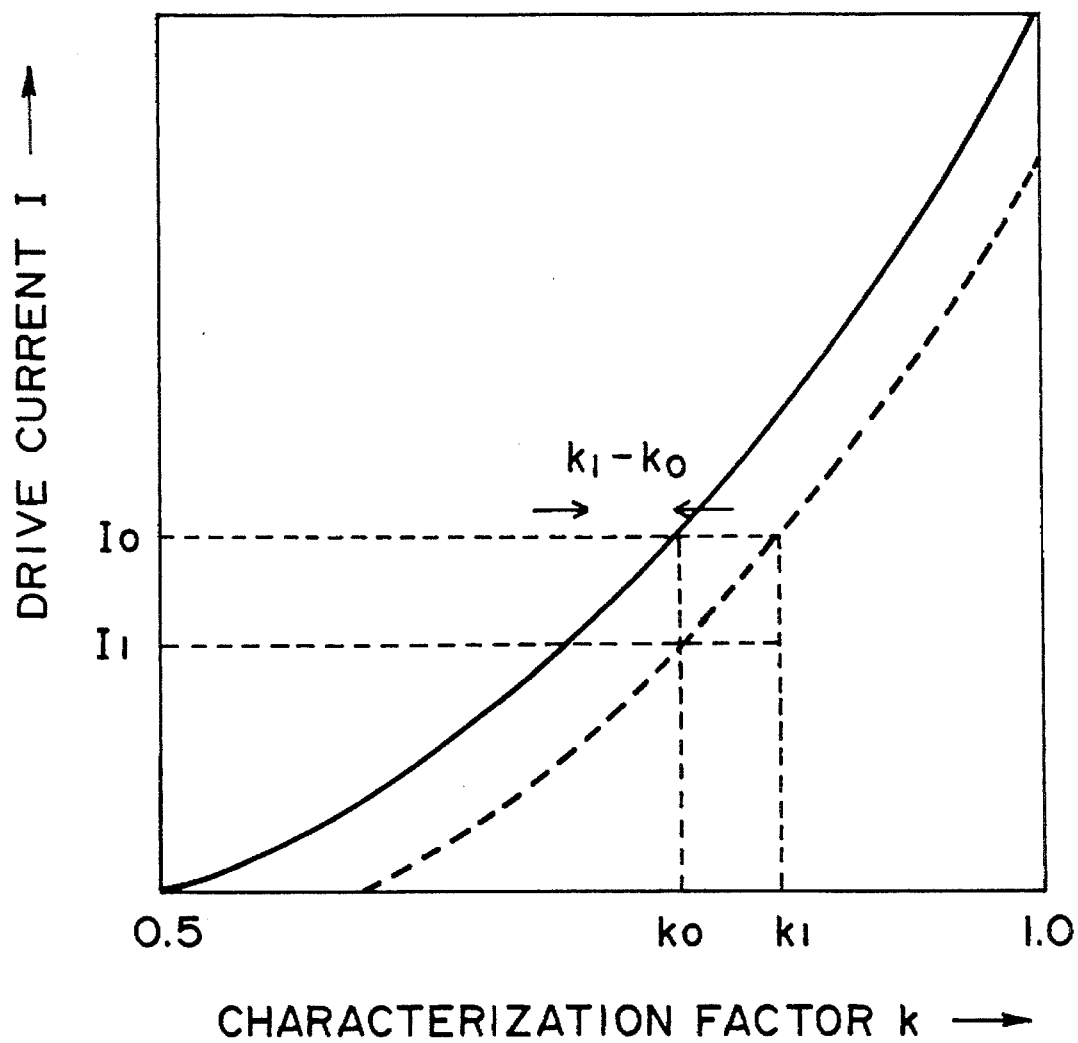
F I G. 4

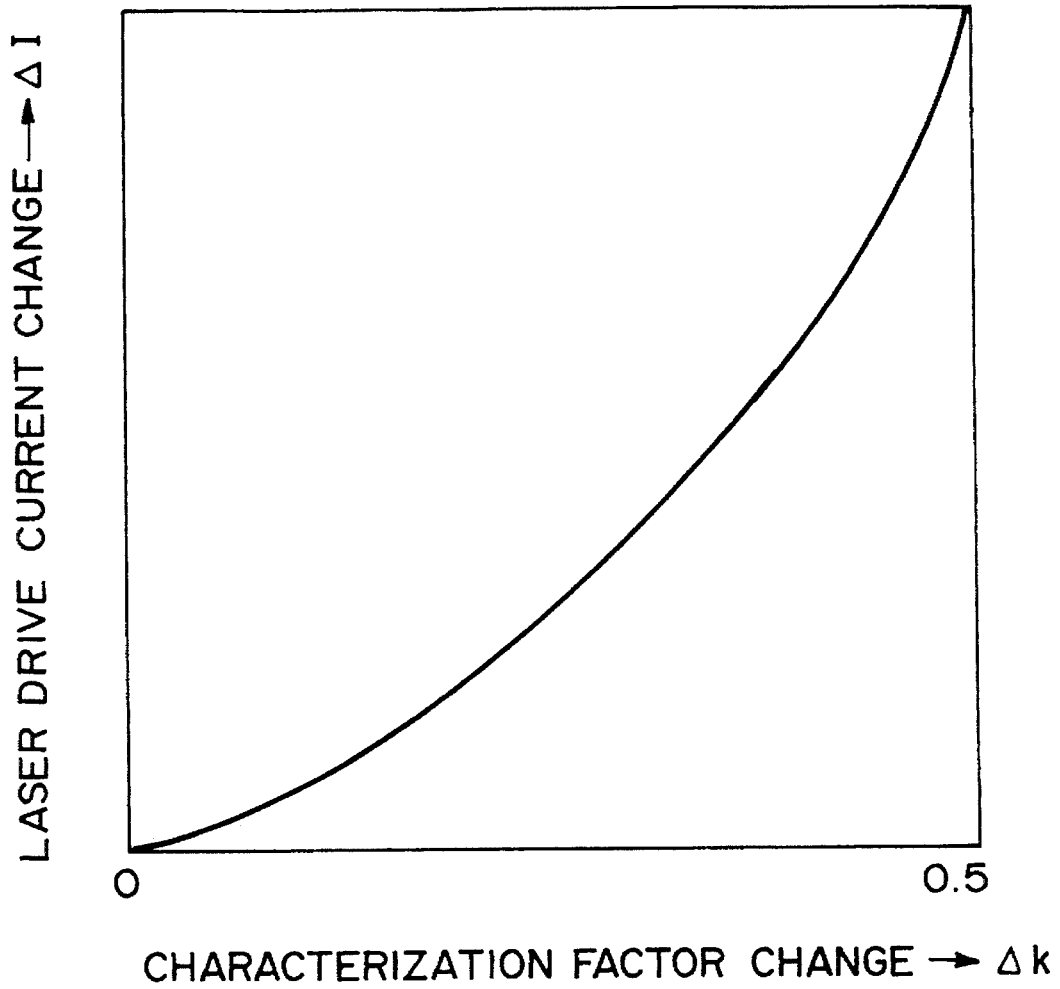
F I G. 5

IMAGE FORMING APPARATUS HAVING TONE CORRECTING FUNCTION

FIELD OF THE INVENTION AND RELATED ART

The present invention relates to an image forming apparatus in which tone correction is performed by an image processor, and more particularly to an image forming apparatus in which tone correcting information is changed in accordance with a characteristic change of a photosensitive member, and the tone is corrected on the basis of the tone correcting information after such change.

In image forming apparatuses such as a laser beam printer or a copying machine, various density processing operations are carried out in order to provide density tone with print output. The density processing operations include as an example γ- conversion.

The γ-conversion means a tone correction in which on the basis of a γ-conversion table, which is a kind of image correcting information, the image data of an original inputted into the image processing device and image signals outputted from the image processing device, are caused to correspond to each other. By the image signals, the exposure amount of the exposure means, for example, the light quantity of the laser beam, in the case where the exposure means includes a laser unit, and the potential of the electrostatic latent image on the photosensitive member, and therefore the density of the toner after the development, and further therefore, the density of the final copy, is determined. In view of this, it will be understood that by properly effecting the γ-conversion, the relation between the copy density and the original density, that is, the image data of the original, is made linear.

When the γ-conversion uses 4 bit CPU, for example, the γ table is such that the original image tone is classified into 16 tone levels from white to black, and the image data are constituted by the 16 data so that the image data correspond to 16 level image signals. Through the γ conversion table on the basis of the 16 level data, the density tone levels of the original image are faithfully reproduced on the copy.

In view of the change of a photosensitive member property, such as a sensitivity or electric resistance thereof due to long term use of the image forming apparatus, for example, it is required that a number of γ conversion tables are prepared. This means that the image forming apparatus has to be provided with large memory.

Without such memory, it is required that the photosensitive member property changing with time is determined frequently, and the correction is made by rewriting the γ conversion table in view of the change. It takes a long time to correctly determine the 16-level surface potentials and to calculate the γ table data.

SUMMARY OF THE INVENTION

Accordingly, it is a principal object of the present invention to provide an image forming apparatus having a highly accurate tone correcting function with a simple control system.

It is another object of the present invention to provide an image forming apparatus capable of forming a high quality color image with simple tone level correction.

According to an aspect of the present invention, there is provided an image forming apparatus comprising an electrophotographic photosensitive member, latent image forming means for forming an electrostatic latent image by charging the photosensitive member and exposing it to light information, means for controlling the latent image forming means to control tone reproducibility of the electrostatic latent image, image forming means for forming an image having light, halftone and dark portions, for tone control, and detecting means for detecting a state of the tone control image, and wherein the control means controls the electrostatic latent image forming means on the basis of a datum from the detecting means and a predetermined tone correcting information.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a block diagram of a controller and elements therearound.

FIG. 2 is a sectional view of an image forming apparatus according to an embodiment of the present invention.

FIG. 3 is a graph of a characterization factor k.

FIG. 4 is a graph of a relationship between the characterization factor k and a driving current I in a first embodiment of the present invention.

FIG. 5 is a graph of a relationship between a change δk of the characterization factor and a change δI of the driving current I according to a second embodiment of the present invention.

DESCRIPTION OF THE PREFERRED EMBODIMENTS

Figure 6:
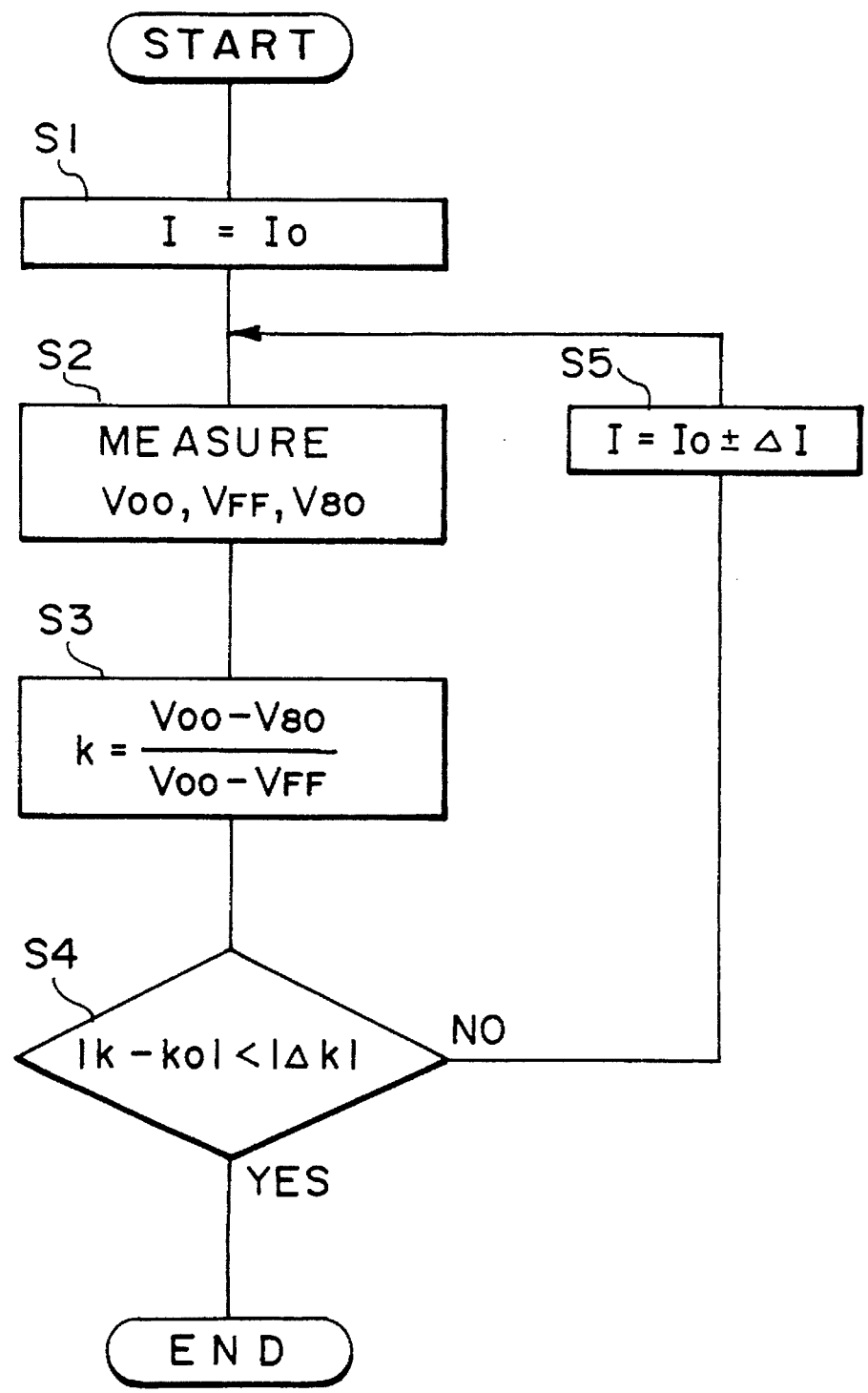
FIG. 6 is a flow chart of operations according to a third embodiment of the present invention.

Referring first to FIG. 2, there is shown an image forming apparatus according to an embodiment of the present invention. It is in the form of a four color digital electrophotographic copying machine 1. The copying machine 1 comprises a reader 2 for reading image information of an original D on an original supporting platen and a printer 3.

The reader 2 is provided with an original illumination lamp 6, a short focus lens array 7 and a CCD (image sensor) 9 which are mounted on a unit 5 which reciprocates in the directions of arrow A. To the CCD 9, an image processor 10 receiving the image data from the CCD 9, is connected.

The printer 3 is provided with exposure means 11 for receiving image signals from the image forming apparatus 10. The exposure means 11 comprises a laser unit 13, a polygonal mirror 13, a mirror 15 and the like to expose the photosensitive member 16 to the laser beam.

The photosensitive member 16 is supported for rotation in the counterclockwise direction (arrow). Around the photosensitive member 16, there are provided a charger 17 for uniformly charging the surface of the photosensitive member 16 prior to the image exposure of the photosensitive member, and a developing device 18 for developing an electrostatic latent image formed on the surface of the photosensitive member 16 by the image exposure.

The developing device 18 comprises a rotatable member 19, and yellow, magenta, cyan and black developing devices 19Y, 19M, 19C and 19D for four colors, which are supported on the rotatable member 19. The developing devices contain corresponding color developers (toners). Using developing devices 19Y, 19M, 19C and 19B, electrostatic latent images on the photosensitive member 16 are sequentially developed, and the developed toner image is transferred onto a transfer material (sheet) P wrapped around a transfer drum 20.

The transfer material P is accommodated in a sheet cassette 21 disposed at a lower front (right in FIG. 2) position of the printer 3, and is supplied to the transfer drum 20 by a pick-up roller 22, feeding rollers 23 and registration rollers 25 and the like. The transfer material P receives sequentially the four color toner images from the photosensitive member 16 with the aid of a transfer charger 26. Then, the transfer material is conveyed on a conveyer belt 27 to an image fixing device 29 where the toner image is fixed on the transfer material. The transfer material is then discharged to a sheet discharge tray 30, and the copy is finally completed.

In such a digital type copying machine 1, in order to cause the tone levels of the original D to correspond to the tone levels of the final copy, tone level correcting information is used. More particularly, the tone level correcting information is used between the image data supplied to the image processing device 10 and the image signal outputted from the image processing device 10 to the exposure means 11, so that linearity is assured in the tone reproduction between the original D and the copy.

The tone reproduction of the final copy is significantly influenced by the potential of the electrostatic latent image formed on the photosensitive member 16.

As for the image correcting information, a γ conversion table described hereinbefore is usually used. In this invention, a characterization factor k of the photosensitive member 16 is used in place of the γ conversion table. The property of the photosensitive member 16 changes due to repeated charging and exposure operations and light fatigue. Then, even if the same charging and exposure operations are effected, the potential of the electrostatic latent image varies depending on the properties of the photosensitive member 16 at that time. Therefore, in order to maintain a proper potential of the electrostatic latent image, the exposure amount by the laser is changed. The introduced characterization factor k is a parameter representing a property of the photosensitive member 16 relative to the potential. In order to determine the characterization factor k, a potential detecting sensor 31 for detecting the potential of the electrostatic latent image on the photosensitive member 16 is disposed between the exposure position and the developing position around the photosensitive member 16.

A detailed description will be made as to tone correction using the characterization factor k.

A pattern generator 32 shown in FIG. 1 generates an image signal 00HEX (hexagonal) corresponding to a white portion of the image, an image signal FFHEX corresponding to a black portion of the original and an image signal 80HEX corresponding to a half tone portion. Image signals are supplied to a laser drive control circuit 12a to drive the laser driver 12b. Using a laser oscillator 12c having a laser driving current $I_0$, latent images are formed on the photosensitive member 16, corresponding to 00HEX, FFHEX and 80HEX.

The surface potential of the photosensitive member 16 is measured by a potential detecting sensor 31 and a potential measuring unit 33. The data is supplied to a controller 35. It is assumed that the surface potentials of the photosensitive member 16 corresponding to the image signals 00HEX, FFHEX, 80HEX, are $V_{00}$, $V_{FF}$ and $V_{80}$.

The CPU 36 of the controller 35 determines the characterization factor K of the photosensitive member 16, which is defined as:

$$k=(V_{00}-V_{80})/(V_{00}-V_{FF})$$

This represents a degree of linearity of the photosensitivity characteristics (E–V characteristics) of the photosensitive member 16.

Referring to FIG. 3, when k=0.5, the surface potentials $V_{00}$, $V_{80}$ and $V_{FF}$ of the photosensitive member are linear (straight) relative to the image signals 00HEX, 80HEX and FFHEX. When the surface potential change becomes steep, the characterization factor k increases, exceeding 0.5. The characterization factor k changes depending mainly on the temperature or humidity of the ambience around the photosensitive member 16 and the time of use of the photosensitive member 16 (deterioration with time).

In FIG. 3, the E–V characteristics are represented by a curve. However, even if the characteristics of the photosensitive member 16 change, the corresponding curves do not cross with each other, and therefore, they determine a one-to-one relation with the characterization factors k. The tone reproduction of the output image (copy) is better if the characterization factor k is closer to 0.5. However, it changes if the laser beam quantity, that is, the laser driving current I changes. This will be described in conjunction with FIG. 4.

In FIG. 4, the ordinate represents a laser driving current I, and the abscissa represents the characterization factor k. It is assumed that when $V_{00}$, $V_{80}$ and $V_{FF}$ are measured, it is found that the characterization factor has changed from $k_0$ to $k_1$ due to the temperature, humidity or use period of the photosensitive member 16. In this case, the curve translates (shifts parallel) in a direction such that the characterization factor k increases, by the amount $k_1-k_0$, as shown by broken line in FIG. 4. Previously, $k_0$ corresponds to $I_0$, but now, $k_0$ corresponds to $I_1$. In view of this, if the driving current is selected to be $I_1$, then the optimum characterization factor $k_0$ as before, can be provided again. Such a relationship between k and I, is stored in the form of a table in a ROM 37 of the controller 35 shown in FIG. 1. In addition, the current $I_0$ for providing a laser illumination quantity sufficient to provide a required development contrast and $k_0$ making the characterization factor closer to 0.5, are also stored as a pair.

A new $I_1$ is determined through the method described above, so that a constant tone reproducibility can be provided at all times. The required data, which are the three point surface potentials $V_{00}$, $V_{80}$ and $V_{FF}$ of the photosensitive member 16 and k-I, may be in the form of one table.

Referring to FIG. 5, a description will be made as to a second embodiment.

In FIG. 5, the abscissa represents a change δk of the characterization factor k, and the ordinate represents a change δI of the laser driving current I.

The surface potentials $V_{00}$, $V_{FF}$ and $V_{80}$ on the photosensitive member 16 are measured by the potential detecting sensor 31, and the characterization factor $k_0$ at the initial current $I_0$ is determined. Thereafter, on the basis of the relation defined in the graph of FIG. 5, the change δI of the laser driving current I is determined. The relationship represented by the graph of FIG. 5 may be stored in the ROM 37 in the form of a table. The table is determined so that the actual driving current is $I_0-δI$.

FIG. 6 illustrates a third embodiment, in which the relationship between the characterization factor k and the laser drive current I is not stored, but it is determined on the basis of measurement at proper times. FIG. 6 is a flow chart of the operation for this purpose. When a measuring mode operation for measuring k is started, the laser drive current is set to $I_0$ (S1). Subsequently, the surface potentials $V_{00}$, $V_{FF}$ and $V_{80}$ of the photosensitive member 16, are measured (S2). The measuring method is similar to that in the first embodiment.

Then, the characterization factor k is determined by calculation at step S3. A determination is made as to the characterization factor k (S4). If $|k-k_0|<|\delta k|$, that is, if the determined characterization factor k is within $\pm \delta k$ from the initial level $k_0$, then the laser driving current for the image forming operation is selected to be $I_0(I=I_0)$.

If $k-k_0>\delta k$, then I is set to $I_0-\delta I$ at step S5, and the operations of steps S2, S3 and S4 are repeated. If $k-k_0<-|\delta k|$, then I is set to $I_0+\delta I$, and the operations of steps S2, S3 and S4 are repeated.

In this manner, the driving current I is changed so that the driving current I is set so as to maintain the characterization factor k to be within $k_0 \pm \delta k$ (substantially constant). By doing so, the same advantageous effects as in the foregoing embodiments, can be provided.

The above operations may be performed when a main switch of the image forming apparatus is actuated, when the photosensitive member 16 is exchanged, when the laser unit 12 is exchanged, or at regular intervals.

Figure 7:
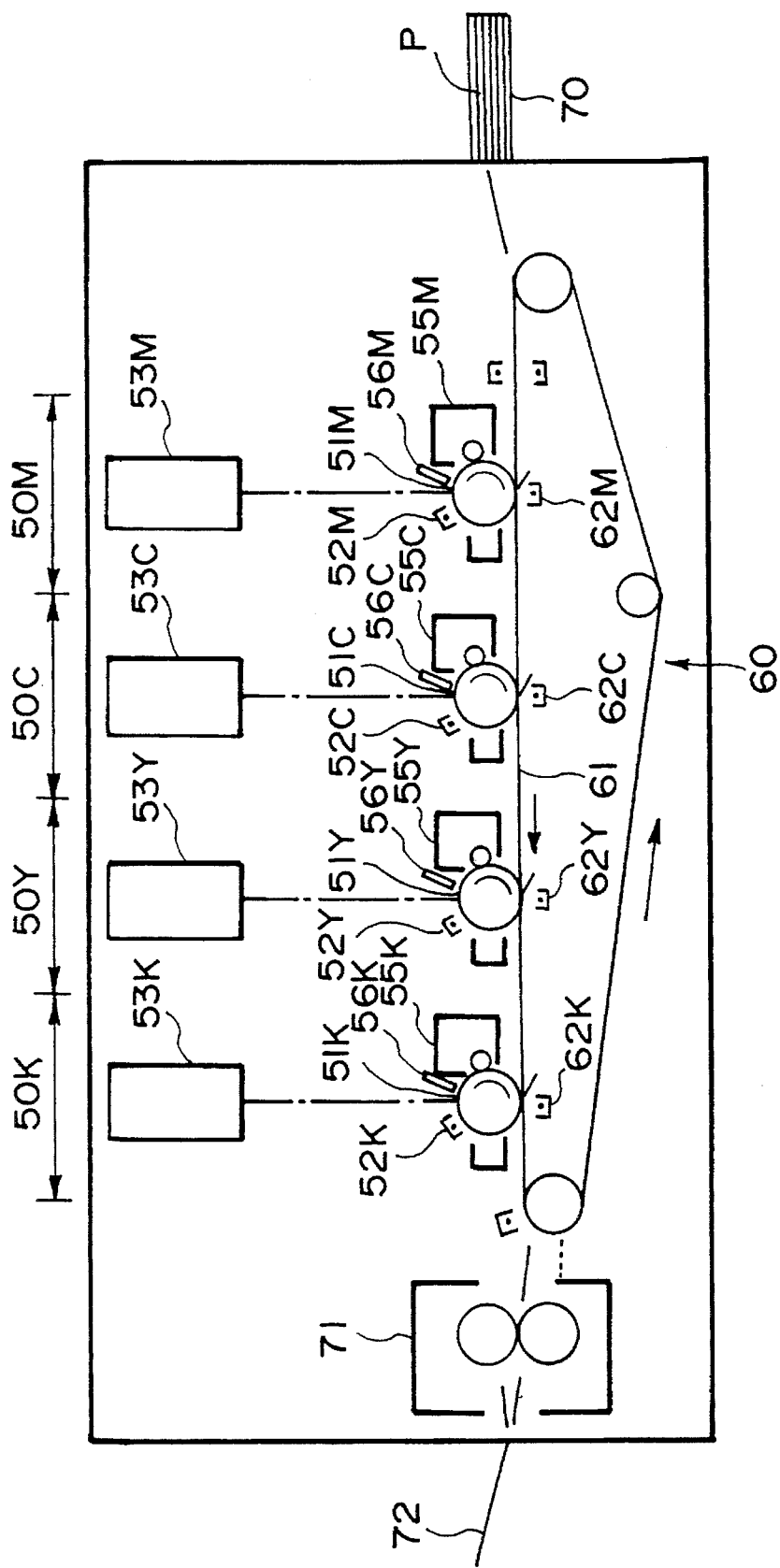
FIG. 7 is a sectional view of an image forming apparatus according to a fourth embodiment of the present invention.

Referring to FIG. 7, a fourth embodiment of the present invention will be described in which plural image forming stations are provided. The apparatus of FIG. 7 comprises four image forming stations 50M, 50C, 50Y and 50K. It is in the form of a laser beam printer having four drums.

Each of the image forming stations 50M, 50C, 50Y and 50K comprises a photosensitive member 51M, 51C, 51Y, 51K, each having image forming means therearound. The images formed on the photosensitive members 51M, 51C, 51Y and 51K in the respective image forming stations 50M, 50C, 50Y and 50K, are transferred onto a transfer material P carried on a transfer belt.

The magenta, cyan, yellow and black image forming stations 50M, 50C, 50Y and 50K include photosensitive members 51M, 51C, 51Y and 51K, respectively. The photosensitive members are rotated in the directions indicated by the arrows. Around the respective photosensitive drums 51M, 51C, 51Y and 51K, there are provided chargers 52M, 52C, 52Y and 52K, scanning optical systems 53M, 53C, 53Y and 53K, and developing devices 55M, 55C, 55Y and 55K, respectively.

An image transfer station 60 constituting a part of the image forming means comprises a transfer belt 61 common to the image forming stations 50M, 50C, 0Y and 50K, and transfer chargers 62M, 62C, 62Y and 62K. The formation of full-color images is accomplished by transferring the respective color toner images sequentially from the photosensitive members 51M, 51C, 51Y and 51K to the sheet material P on the transfer belt 61. The transfer material P is supplied from a sheet supply cassette 70 and is separated after the image transfer operation, and it is fed to an image fixing device 71. Finally, it is discharged to a sheet discharge tray 72.

The first, second and third embodiments may be incorporated in this type of image forming apparatus. More particularly, potential detecting sensors 56M, 56C, 56Y and 56K are disposed for the respective image forming stations 50M, 50C, 50Y and 56K, independently from each other, in order to detect the surface potentials. Then, the respective laser drive currents are controlled. Alternatively, the surface potential measurement is accomplished in a representative station, and the determined value is used to control also the other stations. In this case, the same advantageous effects are provided, and in addition, the characterization factor K may be made constant over any stations, and therefore, the possible disturbance to the color balance due to a variation of the characterization factors k, can be avoided.

As described in the foregoing, according to the present invention, a characterization factor is introduced on the basis of the light, dark and halftone potential portions of the photosensitive member as the tone correcting information. Therefore, a small memory sufficient to store the characterization factor, or simple and short time measurement and calculation to determine the characterization factor, is sufficient to accomplish proper tone correction in accordance with the change of the characteristics of the photosensitive member.

In the foregoing embodiments, electrostatic latent images corresponding to the light, halftone and dark portions, are formed, and potentials thereof are measured. As another example, the latent images may be developed with toner, and optically measured a using light source and photoreceptor. As a further example, the images may be transferred onto a transfer material, and the transferred toner may be measured.

According to this invention, highly accurate correction is possible as compared with the case in which only the light portion, the dark portion or the halftone portion is formed to determine the operating condition.

While the invention has been described with reference to the structures disclosed herein, it is not confined to the details set forth and this application is intended to cover such modifications or changes as may come within the purposes of the improvements or the scope of the following claims.

What is claimed is:

1. An image forming apparatus comprising:

a photosensitive member;

charging means for uniformly charging said photosensitive member;

exposure means for exposing said photosensitive member charged by said charging means to light modulated in accordance with an image signal to form an electrostatic image including potential portions respectively corresponding to a first density, a second density higher than the first density and a third density higher than the second density;

potential detecting means for detecting first, second and third potentials of the electrostatic image respectively corresponding to the first, second and third densities;

calculating means for calculating a potential contrast ratio on the basis of potentials detected by said potential detecting means;

storing means for storing data corresponding to a plurality of image forming conditions; and selecting means for selecting data corresponding to an image forming condition on the basis of a ratio calculated by said calculating means.

2. An apparatus according to claim 1, wherein the image forming conditions include exposure conditions of said exposure means.

3. An apparatus according to claim 2, wherein said exposure means includes a laser source, and the light is a laser beam.

4. An apparatus according to claim 1, wherein said calculating means calculates the ratio of the difference between the first and second potentials and the difference between the first and third potentials.

5. An apparatus according to claim 1, wherein the first density corresponds to a white portion, the second density corresponds to a halftone portion, and the third density corresponds to a black portion.

6. An apparatus according to claim 1, further comprising a yellow developing device containing yellow toner, a magenta developing device containing magenta toner, and a cyan developing device containing cyan toner, and wherein said apparatus is capable of forming a full color image.

* * * * *

UNITED STATES PATENT AND TRADEMARK OFFICE
CERTIFICATE OF CORRECTION

PATENT NO. : 5,485,191        Page 1 of 2
DATED : January 16, 1996
INVENTOR(S) : SONO GU It is certified that error appears in the above-indentified patent and that said Letters Patent is hereby corrected as shown below:

On title page,

At [56] References Cited

"Yamada et al.%346/108" should read
--Yamada et al. 346/108--.

Column 1

Line 37, "are" should read --is--.
Line 38, "the 16" should read --16-bit-- and "correspond" should read --corresponds--.

Column 4

Line 34, "broken" should read --a broken--.

UNITED STATES PATENT AND TRADEMARK OFFICE
CERTIFICATE OF CORRECTION

PATENT NO. : 5,485,191

DATED : January 16, 1996

INVENTOR(S) : SONO GU

It is certified that error appears in the above-indentified patent and that said Letters Patent is hereby corrected as shown below:

Column 5

Line 49, "0Y" should read --50Y--.
Line 62, "56K," should read --50K,--.

Column 6

Line 19, "a using" should read --using a--.

Signed and Sealed this

Ninth Day of July, 1996

Attest:

BRUCE LEHMAN

*Attesting Officer*       *Commissioner of Patents and Trademarks*